US009542390B2

(12) United States Patent
Shankaranarayana (10) Patent No.: US 9,542,390 B2
(45) Date of Patent: Jan. 10, 2017

(54) METHOD AND APPARATUS FOR MITIGATING FACE AGING ERRORS WHEN PERFORMING FACIAL RECOGNITION

(71) Applicant: Adobe Systems Incorporated, San Jose, CA (US)

(72) Inventor: Sudhir Tubegere Shankaranarayana, Bangalore (IN)

(73) Assignee: ADOBE SYSTEMS INCORPORATED, San Jose, CA (US)

( * ) Notice: Subject to any disclaimer, the term of this patent is extended or adjusted under 35 U.S.C. 154(b) by 102 days.

(21) Appl. No.: 14/266,044

(22) Filed: Apr. 30, 2014

(65) Prior Publication Data

US 2015/0317512 A1 Nov. 5, 2015

(51) Int. Cl.
*G06K 9/00* (2006.01)
*G06K 9/46* (2006.01)
*G06F 17/30* (2006.01)
*G06K 9/62* (2006.01)
*G06K 9/68* (2006.01)

(52) U.S. Cl.
CPC ......... *G06F 17/30* (2013.01); *G06F 17/30259* (2013.01); *G06K 9/00288* (2013.01); *G06K 9/00926* (2013.01); *G06K 9/468* (2013.01); *G06K 9/6201* (2013.01); *G06K 9/6807* (2013.01)

(58) Field of Classification Search
CPC ............... G06K 2009/00322; G06K 9/00288; G06K 9/00221; G06K 9/00281; G06K 9/6267; G06K 9/00248; G06K 9/00268; G06K 9/00295; G06K 9/6218; G06T 2207/30201; G06F 17/30247; G06Q 50/01
See application file for complete search history.

(56) References Cited

U.S. PATENT DOCUMENTS

| 7,440,930 | B1* | 10/2008 | Brandt ............................ 706/30 |
| 2008/0075337 | A1* | 3/2008 | Fukushi ........................ 382/118 |
| 2010/0074540 | A1* | 3/2010 | Tang et al. .................... 382/225 |
| 2011/0038550 | A1* | 2/2011 | Obrador ........................ 382/225 |

OTHER PUBLICATIONS

Lubomir Bourdev et al., "Robust Object Detection Via Soft Cascade", Office of Technology, Adobe Systems Inc., 345 Park Avenue, San Jose, CA 95110, 8 pgs.

* cited by examiner

*Primary Examiner* — Kim Vu
*Assistant Examiner* — Michael Vanchy, Jr.
(74) *Attorney, Agent, or Firm* — Keller Jolley Preece (57) ABSTRACT

A computer implemented method and apparatus for mitigating face aging errors when performing facial recognition. The method comprises receiving an indication of a face that needs to be searched in an image set, where each image in the image set comprises a timestamp that identifies a creation date of the image, the creation date being in a continuum of successive time intervals; and identifying the indicated face in images taken in each time interval of a plurality of successive time intervals for the indicated face, wherein each face found in images taken in a previous successive time interval is used as a reference set for identifying the face in images taken in a next successive time interval.

20 Claims, 6 Drawing Sheets

METHOD AND APPARATUS FOR MITIGATING FACE AGING ERRORS WHEN PERFORMING FACIAL RECOGNITION

BACKGROUND OF THE INVENTION

1. Field of the Invention

Embodiments of the present invention generally relate to facial recognition and, more particularly, to techniques for mitigating face aging errors when performing facial recognition.

2. Description of the Related Art

Often, people have large photo libraries that include a significant number of images taken over a large span of time, sometimes over a course of many years. A user may wish to search all images in his photo library for a particular person. Facial recognition algorithms detect a face of the person from the images in the photo library. Currently, facial recognition solutions rely on age simulation models or age transformation models that create an aged model of a given face and then run facial recognition algorithms using the aged models. These techniques are unreliable, particularly when a large time gap exists between the time that an initial photo containing the face is taken and the time when the searched photos were taken. These techniques are also unreliable when applied to photos of children, whose faces change significantly over a short period of time. Therefore, there is a need for a method and apparatus for mitigating face aging errors when performing facial recognition.

SUMMARY OF THE INVENTION

The Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A method for mitigating face aging errors when performing facial recognition is described. The method receives a selection of a face in an image of an image set. Each image in the image set comprises a timestamp that identifies a creation date of the image. The creation date is a date in a continuum of successive time intervals. The method searches to identify the indicated face in images taken in each time interval of a plurality of successive time intervals for the indicated face, where each face found in images taken in a current time interval is used as a reference set for identifying the face in images taken in a next successive time interval.

In another embodiment, an apparatus for mitigating face aging errors when performing facial recognition is described. The apparatus comprises a search module. The search module receives a selection of a face in an image of an image set. Each image in the image set comprises a timestamp that identifies a creation date of the image. The creation date is a date in a continuum of successive time intervals. The search module searches to identify the indicated face in images taken in each time interval of a plurality of successive time intervals for the indicated face, where each face found in images taken in a current time interval is used as a reference set for identifying the face in images taken in a next successive time interval.

In yet another embodiment, a computer readable medium for mitigating face aging errors when performing facial recognition is described. The computer readable medium stores computer instructions that, when executed by at least one processor, causes the at least one processor to perform the method for mitigating face aging errors when performing facial recognition.

While the method and apparatus is described herein by way of example for several embodiments and illustrative drawings, those skilled in the art will recognize that the method and apparatus for mitigating face aging errors when performing facial recognition is not limited to the embodiments or drawings described. It should be understood, that the drawings and detailed description thereto are not intended to limit embodiments to the particular form disclosed. Rather, the intention is to cover all modifications, equivalents and alternatives falling within the spirit and scope of the method and apparatus for mitigating face aging errors when performing facial recognition defined by the appended claims. Any headings used herein are for organizational purposes only and are not meant to limit the scope of the description or the claims. As used herein, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Techniques are provided herein that allow for mitigating face aging errors when performing facial recognition. A face of a person is indicated in an image. The face indicates a person to be searched for in a set of images. The set of images is ordered according to a timestamp of when each image in the image set was taken. The timespan in which the timestamps of the ordered image set extends or ranges is divided into a plurality of successive time intervals. In some embodiments, the time intervals are predefined, for example one month time intervals. The ordered image set is then searched incrementally and successively, that is, one successive time interval at a time. For example, if the indicated face has a timestamp in a first time interval, and the first time interval includes all images taken in January 2014, the second time interval may include all images taken in December 2013 or February 2014. The indicated face is used as a reference face with which to perform facial recognition. Facial recognition identifies images in the first time interval that include the face. Each face in an image is compared to the indicated face. If a face in an image matches the indicated face, then the face is added to a positive reference set. In addition, the image is added to a resultant image set. If the image includes one or more faces that do not match the indicated face, the one or more non-matching faces are added to a negative reference set. For example, an image includes a first face that matches the indicated face in addition to a second face. The first face is added to the positive reference set, the second face is added to the negative reference set, and the image is added to the resultant image set. If an image includes one or more faces and none match the indicated face, then all faces in the image are added to the negative reference set.

Images in the first time interval have timestamps within a predefined interval, for example, a month from when the image that includes the indicated face was taken. Faces in images from the first time interval that are found to match the face of the person being searched are used as reference faces to perform facial recognition to identify the face of the person in images taken during a second time interval. Images searched during the second time interval include images that have a timestamp within a predefined interval, forward or backward in time, from the timestamps of the images in the first time interval. The process is repeated one interval at a time until all images have been searched. As such, the originally indicated face is not used to search all images in the image set. Rather, only faces that were identified in images taken within a current time interval are used to identify the face of the person being searched in images taken within a next time interval. In other words, although the image set may be taken, for example, over a period of ten years, the faces searched for in images taken five years ago are compared to faces of the person identified in images that were taken four years and eleven months ago, resulting in more accurate facial recognition. In addition, using faces in the negative reference set to exclude possible matches increases the accuracy of the search.

As previously explained, existing solutions rely on age simulation models or age transformation models that create an aged model of a given face and then run facial recognition on the aged models. These techniques are notoriously unreliable.

Thus, and in accordance with an embodiment of the present invention, techniques are provided herein that allow for mitigating face aging errors when performing facial recognition. Embodiments of the present invention receive a selection of a face in an initial image. The initial image is an image that is part of a larger image set. Each image in the image set has a timestamp that identifies when the image was taken. The selection of the face may be made by a user, for example, by "tagging" a face, or using any technique for selecting a specific face in an image. The selection identifies the face of a person that the user wishes to search for in the image set. Only the images that include at least one face are searched. As such, the image set is filtered to remove any images that do not include a face. The remaining images, hereafter referred to as the filtered image set, are arranged in order according to a timestamp that identifies when the image was taken. Arranging the images in order, based on time, allows the images to be searched efficiently one time interval at a time.

Facial recognition is performed on images taken in a first time interval using the indicated face as a reference. The images in the first time interval include all images that were taken within a pre-defined time interval, for example, one month, from when the initial image was taken. For example, the filtered image set may include 5000 images, each of the images having a timestamp ranging from Feb. 1, 2000 through Feb. 1, 2014. Assume that the initial image that includes the face indicated for facial recognition was taken Feb. 1, 2014. The indicated face is searched for in images taken within the first time interval from when the initial image was taken, in this example, in images taken in January of 2014.

Each face in an image is compared to the indicated face. If a face in an image matches the indicated face, then the matching face is added to a positive reference set. In addition, the image is added to a resultant image set. If the image includes one or more faces that do not match the indicated face, the one or more non-matching faces are added to a negative reference set. For example, an image includes a first face that matches the indicated face in addition to a second face. The first face is added to the positive reference set, the second face is added to the negative reference set, and the image is added to the resultant image set. If an image includes one or more faces and none match the indicated face, then all faces in the image are added to the negative reference set.

After images in the first time interval are searched, the initial image that includes the original selection of the face is added to the resultant image set. The original indicated face is no longer used to search for the face in other images. Each face that matches the person being searched that was found in images in the first time interval is in the positive reference set. The faces in the positive reference set are then used to perform facial recognition on images in a second time interval. The images in the second time interval include images with timestamps within a next successive time interval to the first time interval. The negative reference set is used to identify and exclude faces in images in the second time interval. For example, a group of friends may be consistently featured in the set of images. The faces of the negative reference set are matched to faces in images in the second time interval to identify faces that are not the face of the person being searched. As such, in the present example, the identified faces in the positive reference set from January 2014 are used as reference faces to perform facial recognition on images taken in December 2013. The faces in the negative reference set from January 2014 are used by the facial recognition algorithm to identify faces that are not a match to the face of the person being searched, in images taken in December 2013.

The process is repeated such that if one or more images are found to include the face of the person being searched in the images in a second time interval, the following steps are taken. First, the images that include the face of the person being searched are added to the resultant image set. The faces in images in the second time interval that match the faces in the positive reference set become the new positive reference set. Faces in images of the second time interval that do not match the faces in the positive reference set become the new negative reference set. When all images in all time intervals have been incrementally and successively searched, the resultant image set includes all images from the original image set that include the indicated face. Because each time interval is searched using faces identified in images of a successive time interval, the identified faces used to perform facial recognition more likely resembles the faces that are being searched. As such, the search results are more accurate.

As used herein, a set of images is any collection of digital images, where the digital images include creation timestamps that identify the specific date/time when the image was taken.

Advantageously, the present invention may be implemented as a plug in to a social networking site or as a plug-in or hosted service to any website that hosts images, such as PICASA, FACEBOOK, and the like. The present invention may also be implemented as part of image viewing/editing/organizing software, such as ADOBE PHOTOSHOP, PHOTOSHOP Elements, and the like. In addition, the present invention may be an individual application for tablets, smartphones or desktop computers, in combination with a larger hosted service. The present invention provides a user with a more accurate method for identifying a face in a large set of images that were taken over a large time span.

Various embodiments of a method and apparatus for mitigating face aging errors when performing facial recognition are described. In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description that follow are presented in terms of algorithms or symbolic representations of operations on binary digital signals stored within a memory of a specific apparatus or special purpose computing device or platform. In the context of this particular specification, the term specific apparatus or the like includes a general-purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Figure 1:
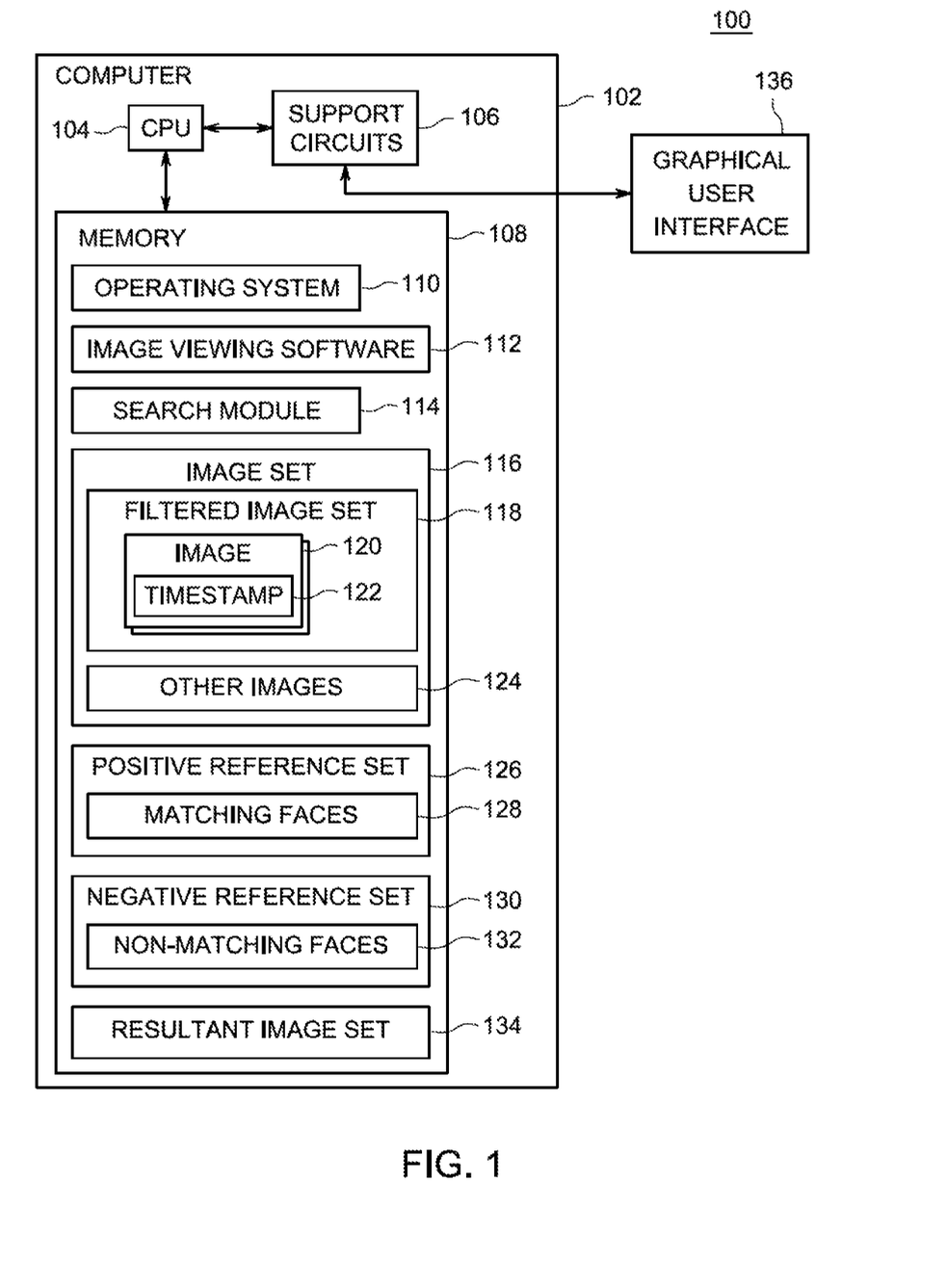
FIG. 1 is a block diagram of a system for mitigating face aging errors when performing facial recognition, according to one or more embodiments.

FIG. 1 is a block diagram of a system 100 for mitigating face aging errors when performing facial recognition, according to one or more embodiments. The system 100 includes a computer 102. The computer 102 is a computing device, for example a desktop computer, laptop, tablet computer, Smartphone, and the like. The computer 102 includes or is attached to a graphical user interface 136. The computer 102 includes a Central Processing Unit (CPU) 104, support circuits 106, and a memory 108. The CPU 104 may include one or more commercially available microprocessors or microcontrollers that facilitate data processing and storage. The various support circuits 106 facilitate the operation of the CPU 104 and include one or more clock circuits, power supplies, cache, input/output circuits, and the like. The memory 108 includes at least one of Read Only Memory (ROM), Random Access Memory (RAM), disk drive storage, optical storage, removable storage and/or the like.

The memory 108 includes an operating system 110, image viewing software 112, a search module 114, an image set 116, a positive reference set 126, a negative reference set 130, and a resultant image set 134. The operating system 110 may include various commercially known operating systems. The image viewing software 112 is any software such as ADOBE® PHOTOSHOP®, PHOTOSHOP® Elements, Photoshop.com, PHOTOSHOP® Touch and the like, capable of viewing images. The image set 116 is any plurality of images wherein each image 120 of the image set 116 includes a timestamp 122. The timestamp 122 represents creation date of the image 120. The image set 116 may be stored on the computer 102 or may be stored in an image viewing repository, such as ADOBE® REVEL™ (adoberevel.com). The image set 116 includes a filtered image set 118 and other images 124. The positive reference set 126 includes one or more matched faces 128, where each of the one or more matching faces 128 is the face of a person being searched. The negative reference set 130 includes one or more non-matching faces 132, where each of the one or more non-matching faces 132 is not the face of the person being searched.

A user initiates a search of the image set 116 using the search module 114. In order to initiate the search, the user identifies a face of a person for whom the user wishes to search. The user identifies the face by for example, marking or tagging one or more faces in one or more images of the image set 116 via the graphical user interface 136 and selects, for example, a SEARCH button. In some embodiments, the search module 114 filters the image set 116 before searching for the face identified by the user to remove images of the image set 116 that do not include faces. In order to filter the image set 116, the search module 114 performs a face detection algorithm on each image of the image set 116 and filters out images from the image set 116 that do not include any faces. The search module 114 stores each image 120 that includes a face in the filtered image set 118. Images in the image set 116 that do not include a face are stored by the search module 114 as other images 124. As such, the filtered image set 118 includes every image 120 in the image set 116 that includes a face. In some embodiments, the search module 114 orders the filtered image set 118 according to the timestamp 122 of each image 120.

For example, the filtered image set 118 may include images taken over a timespan of four years, between January 2010 and January 2014. The search module 114 orders the filtered image set 118 according to a timestamp 122 of each image 120, such that the filtered image set 118 may be efficiently searched. The image 120 that includes the face of the person being searched may be a most current image in terms of timestamp 122, for example, from January 2014. In such case, the images in the filtered image set 118 are searched starting with images taken in January 2014 and then searched incrementally backwards to January 2010. If the image 120 that includes the face of the person being searched was taken in January 2010, then the images taken in January 2010 are searched first and the images in the filtered image set 118 are then search incrementally forward to January 2014. If the image 120 that includes the face being searched was taken at a point in time between the endpoints of the time span of the filtered image set 118, for example, in March 2012, the images in the filtered image set 118 are searched in two separate searches. A first search may, for example, include searching images taken in March 2012 and then searching the filtered image set 118 incrementally backwards in time to January 2010. A second search may be performed on images taken in April 2012 and then the filtered image set 118 is searched incrementally going forward in time to January 2014. For simplicity, the exemplary embodiment describes identifying a face in a most recent image and searching the filtered image set 118 incrementally backwards in time until all images in the filtered image set 118 are searched.

The search module 114 stores the identified face as the matching face 128 in the positive reference set 126. The search module 114 identifies the timestamp 122 of the image 120 that includes the identified face. The search module 114 then identifies a first time interval from the filtered image set 118. Each image 120 in the first time interval in the filtered image set 118 has a timestamp 122 that is within a predefined time interval of the timestamp of 122 one or more images that include a matching face 128 in the positive reference set 126. For example, if the image 120 from which the face was indicated was taken on Jan. 31, 2014, the first time interval includes one or more images 120 with a timestamp 122 that is within, for example, one month of Jan. 31, 2014. As such, the first time interval includes one or more images 120 that were taken in January of 2014. Note that predefined time intervals other than monthly can be used, such as weekly, quarterly, yearly or any other period, such as every 100 days. The search module 114 then performs a facial recognition algorithm on each image 120 in the first time interval to identify the face of the person being searched. If any images 120 in the first time interval are found to include the face of the person being searched, (i.e., the matching face 128 in the positive reference set 126) the search module 114 performs the following steps. The faces in the positive reference set 126 are removed and replaced by the face in each image 120 that is found to match the face being searched. All faces in each image 120 in the first time interval that do not match the face being searched replace the non-matching faces 132 in the negative reference set 130. The search module 114 moves the one or more images 120 in which the face was matched to the resultant image set 134. The resultant image set 134 includes all images in the image set 116 in which the face of the person being searched was found.

The search module 114 then identifies images that are in a second time interval that is incrementally successive to the first time interval. The images in the second time interval are images from the filtered image set 118, where each image 120 includes a timestamp 122 within a predefined time interval of the timestamps of the images 120 in the first time interval. In the present example, the images in the second time interval may be images taken in December 2013. The search module 114 uses a facial recognition algorithm to identify images in the second time interval that include the faces found in images from the first time interval. Each face that is in the positive reference set 126 from the images 120 in the first time interval is used to search images from the second time interval. The search module 114 uses the faces in the negative reference set 130 to exclude faces in images from the second time interval by identifying faces that are not the face of the person being searched. If one or more images 120 in the second time interval are found to include the face of the person being searched, the faces in the images 120 replace the matching faces 128 in the positive reference set 126. All other faces in the images 120 in the second time interval replace the faces in the negative reference set 130. The images 120 that include a matching face are added to the resultant image set 134.

The search module 114 then iterates incrementally through successive time intervals of the filtered image set 118 in accordance with the timestamps of each of the images in the filtered image set 118. With each iteration, when images in the time interval are found to include the face of the person being searched, the faces that match the matching faces 128 in the positive reference set 126 replace the matching faces 128 in the positive reference set 126. All other faces in the images replace the non-matching faces 132 in the negative reference set 130. The images in the time interval that are found to include the face of the person being searched are added to the resultant image set 134.

In the event that no images in a given time interval include the face of the person being searched, the non-matching faces 132 in the negative reference set 130 are replaced by all faces in the images in the given time interval, but the positive reference set 126 remains unchanged. In the event that no images in a predefined number of consecutive time intervals are found to include the face of the person being searched, the search module 114 may prompt the user to mark the face in a next most recent image 120 in the filtered image set 118 that includes the face of the person being searched.

When all images in the filtered image set 118 have been searched, the resultant image set 134 includes all images in the image set 118 that include the face of the person being searched.

Figure 2:
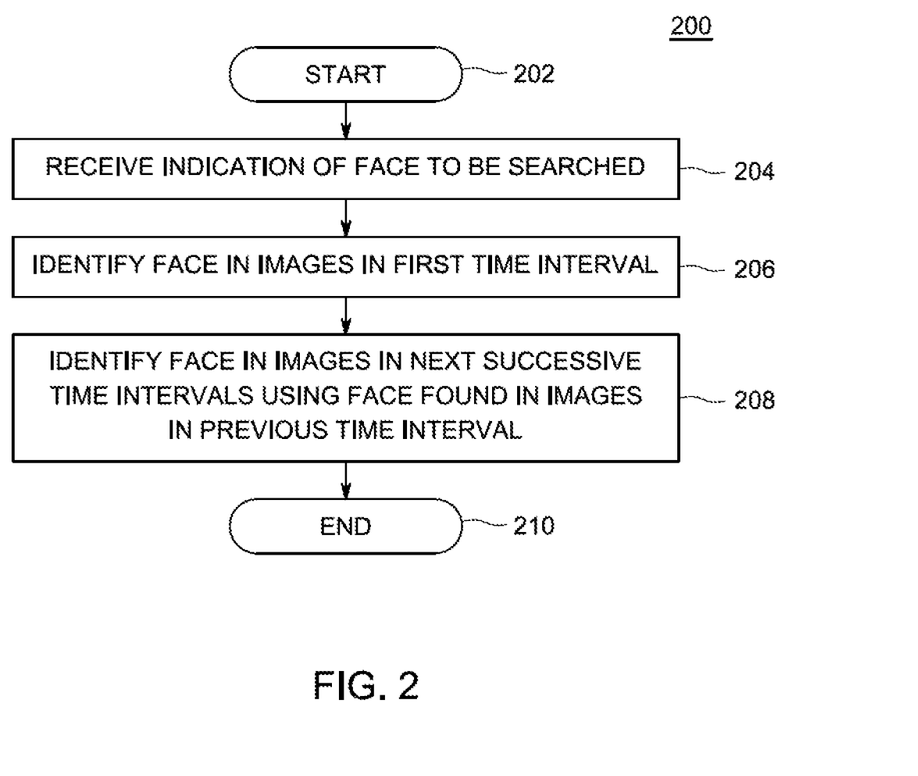
FIG. 2 depicts a flow diagram of a method for mitigating face aging errors when performing facial recognition, as performed by the search module of FIG. 1, according to one or more embodiments.

FIG. 2 depicts a flow diagram of a method 200 for mitigating face aging errors when performing facial recognition, as performed by the search module 114 of FIG. 1, according to one or more embodiments. The method 200 uses the faces found in images of a first time intervals as references to perform facial recognition on images of a second time interval. The method 200 starts at step 202 and proceeds to step 204.

At step 204, the method 200 receives an indication of a face of a person to be searched. In one example, the indication is via a user input of selecting a face in an image, for example by "tagging" the face. The indicated face identifies a person the user would like to search for in an image set. In another example, the indication is received from an uploaded image that includes just the face of the person to be searched. In another example, the indication is received via a camera on a user's device that takes an image of the face to be searched. Any approach to indicating a face of a person to be searched may be utilized. The image set can be any set of images, where each image in the set of images includes a timestamp that identifies a creation date for the image.

The method 200 proceeds to step 206, where the method 200 identifies the indicated face in images in a first time interval, as described in further detail with respect to FIG. 3, below. The method 200 proceeds to step 208, where the method 200 identifies the indicated face in a next successive time interval using the face found in images in a current time interval as described in further detail with respect to FIG. 4, below. The method 200 proceeds to step 210 and ends.

Figure 3:
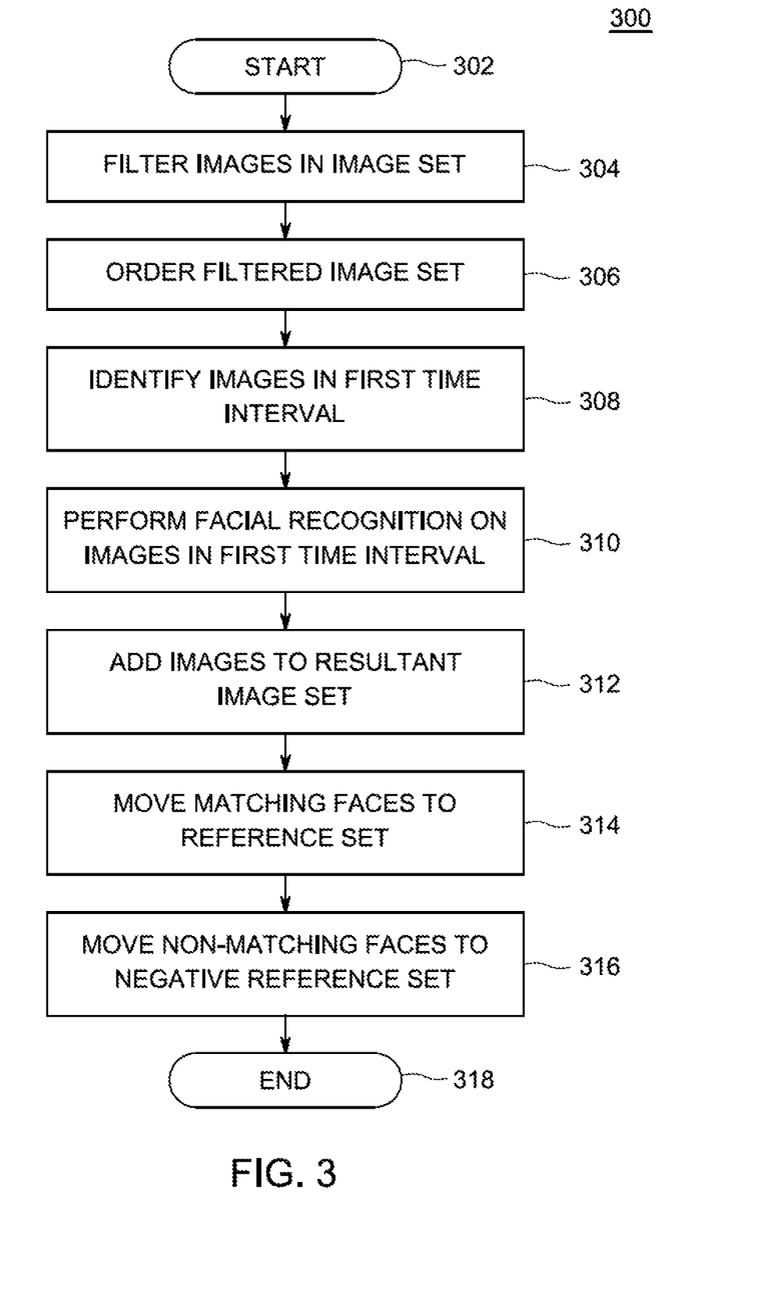
FIG. 3 depicts a flow diagram of a method for identifying a face in images in a first time interval, as performed by the search module of FIG. 1, according to one or more embodiments.

FIG. 3 depicts a flow diagram of a method 300 for identifying a face in images in a first time interval, as performed by the search module 114 of FIG. 1, according to one or more embodiments. The method 300 matches a indicated face against images in a first time interval and uses the results to initialize reference sets that are used to search images in a next successive time interval. The method 300 starts at step 302 and proceeds to step 304.

At step 304, the method 300 filter the image set to remove images in the image set that do not include a face. The method 300 performs a face detection algorithm on each image in the image set to identify which images have faces and which images do not. The method 300 stores the images of the image set that have at least one face in the image as a filtered image set. The method 300 proceeds to step 306.

At step 306, the method 300 orders the filtered image set. The method 300 sorts the images in the filtered image set in chronological order. Each image in the image set includes a timestamp that identifies when the image was taken. The method 300 sorts the images based on their timestamps. For example, an image set may have 10,000 images with timestamps within a timespan ranging from January 2000 through December 2013. The method 300 orders the images according to the timestamp. In some embodiments, the method 300 orders the images in ascending order. In some embodiments, the method 300 orders the images in descending order.

The method 300 proceeds to step 308, where the method 300 identifies images in a first time interval. The image that includes the indicated face is part of the filtered image set. As such, the image includes a timestamp that indicates the date that the image was taken. The method 300 determines where the timestamp of the image falls in the timespan of images. From that determination, the method 300 identifies images in the first time interval to be images that have a timestamp within a predefined time interval from the timestamp of the initial image that includes the indicated face. For example, the image that includes the indicated face may have been taken in January 2000, in December. 2013, or any time in between. If the face in the image was of a boy born in January 2000, the indicated face may be in an image that was taken soon after the baby was born. In such case, the user wants all images that include the baby from birth through December 2013, using the baby's face at birth as the initial reference face to use for searching. As such, the images can later be searched incrementally from January 2000 forward through successive time intervals until December 2013. The time interval used to search through the images is predefined, for example, as one month. As such, the images in the first time interval include all images with timestamps within the predefined time interval from the timestamp of the initial image. For example, if the image was taken on Jan. 1, 2000, the images in the first time interval include all images with a timestamp that falls within the month of January 2000. For simplicity, the exemplary time intervals are described using monthly boundaries, however, as those skilled in the art will recognize, any time interval may be used, such as daily, a fixed multiples of daily, annually, etc.

In another example, the indicated face may in an image taken in December of 2013. The user still wants to search for all images that include the boy from birth until December 2013, but in this example, the user selects the boy's face in an image taken in December 2013 as the initial reference face to use for searching. As such, the images in the first time interval include all images with timestamps within the predefined time interval from the timestamp of the initial image. For example, if the image was taken on Dec. 31, 2013, the images in the first time interval include all images with a timestamp that falls within the month of December 2013.

In yet another example, the indicated face may be in an image taken in January of 2005. The user again wants to search all images that include the boy from birth until December 2013, but in this example, the user selects the boy's face in an image taken in January 2005 as the initial reference face to use for searching. Due to the fact that the initial reference face is taken from a middle of the timespan, the filtered image set can later be searched in two separate searches, for example a first search is performed on images taken from January 2005 incrementally backward in time to January 2000 and a second search is performed on images taken incrementally forward in time from January 2005 through December 2013. In both cases, the initial reference face is used as the reference for the search. The images in the first time interval include all images with timestamps within the predefined time interval before the timestamp of the initial image. Once the search of images taken from January 2005 to January 2000 has completed, the initial reference face is used to search the images taken from January 2005 through December 2013.

The method 300 proceeds to step 310, where the method 300 performs facial recognition on the images in the first time interval. The method 300 may use any facial recognition algorithm known in the art. Facial recognition algorithms identify facial features by extracting landmarks, or features, from an image of the reference face. For example, an algorithm may analyze a relative position, size, and shape of the eyes, nose, cheekbones, and jaw. These features are then used to search the images in the first time interval in order to identify matching features.

The method 300 proceeds to step 312, where the method 300 stores the image that includes the indicated face in a resultant image set. The resultant image set includes all images that include the indicated face. The method 300 proceeds to step 314. At step 314, for each image that includes a face that matches the indicated face, the method 300 stores the matching face in a positive reference set. In some embodiments, the method 300 stores pixel data for each matching face in the positive reference set. The positive reference set is one or more faces that match the face of the person being searched. In a search of images in a next time interval, the facial recognition algorithm uses the faces in the positive reference set to match against faces in images in a next time interval.

The method 300 proceeds to step 316, where the method 300 stores faces that do not match the indicated face in a negative reference set. For each image that includes the indicated face, the method 300 stores all other faces in the image in the negative reference set. In addition, for all images that do not include the indicated face, the method 300 stores all faces in the image in the negative reference set. In some embodiments, the method 300 stores pixel data for each face that does not match the indicated face. As described below, in a search of images in a next time interval, the facial recognition algorithm uses the faces in the negative reference set to exclude from faces in the images of a next time interval that may match the indicated face.

The method 300 proceeds to step 318 and ends.

Figure 4:
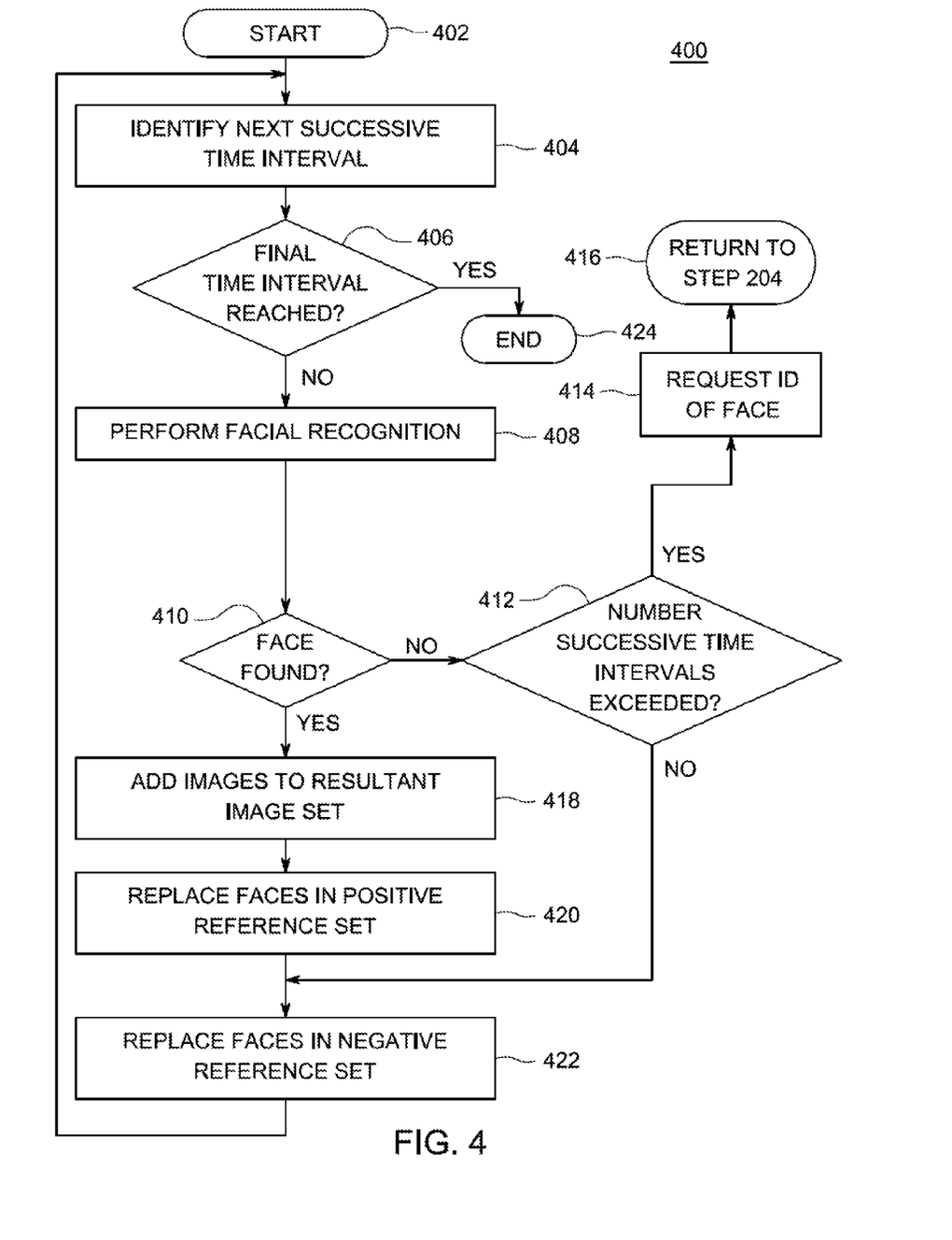
FIG. 4 depicts a flow diagram of a method for identifying a face in successive time intervals, as performed by the search module of FIG. 1, according to one or more embodiments.

FIG. 4 depicts a flow diagram of a method 400 for identifying a face in successive time intervals, as performed by the search module 114 of FIG. 1, according to one or more embodiments. The method 400 uses the results found for the images in a current time interval as reference for searching images in a next successive time interval. The method 400 starts at step 402 and proceeds to step 404.

At step 404, the method 400 identifies a next successive time interval. The method 400 identifies the date/time associated with the next time interval. If, for example, the images are being searched going forward in time, and the predefined time interval is a month, the next time interval is one month after the previous month. For example, if the previous time interval that was searched is January 2000, then the next time interval to be searched is February 2000.

The method 400 proceeds to step 406, where the method 400 determines whether the final time interval has been reached (i.e., there is not a next successive time interval). If the method 400 determines that the final time interval has been reached, the method 400 adds the images in the positive reference set to the resultant image set, at which time the method 400 proceeds to step 424 and ends. However, if at step 406, the method 400 determines that a final time interval has not been reached, the method 400 proceeds to step 408.

At step 408, the method 400 performs facial recognition on the images in the time interval. The method 400 may use any facial recognition algorithm known in the art. Facial recognition algorithms identify facial features by extracting landmarks, or features, from the indicated face in the one or more images in the positive reference set. For example, an algorithm may analyze a relative position, size, and shape of the eyes, nose, cheekbones, and jaw. These features are then used to search the images in the next successive time interval in order to identify matching features.

The method 400 proceeds to step 410, where the method 400 determines whether any images in the time interval were found to include the faces in the positive reference set. If no faces were found, the method 400 proceeds to step 412, where the method 400 determines whether the number of time intervals where no faces in the positive reference set were found exceeds a predefined threshold, for example, three time periods. If the method 400 determines that the threshold has been exceeded, the method 400 proceeds to step 414, where the method 400 requests a identification of the face of the person being searched from an image in a next available time interval. The method 400 then proceeds to step 204 of method 200.

However, if the method 400 determines that the number of time intervals where no faces in the positive reference set were found does not exceed the predefined threshold, the method 400 proceeds to step 422.

If at step 410, the method 400 determines that one or more images were found to include a face that matches the one or more matching faces in the positive reference set, the method 400 proceeds to step 418. At step 418, the method 400 adds the images that include the indicated face to the resultant image set. The method 400 proceeds to step 420.

At step 420, the method 400 replaces the matching faces in the positive reference set with the face in each image that was found to match the matching faces in the positive reference set. The method 400 proceeds to step 422.

At step 422, the method 400 replaces the non-matching faces that were in the negative reference set with the non-matching faces from the images in the time interval. The method proceeds to step 404 and iterates until the images in all time intervals within the timespan of the filtered image set have been searched.

Figure 5:
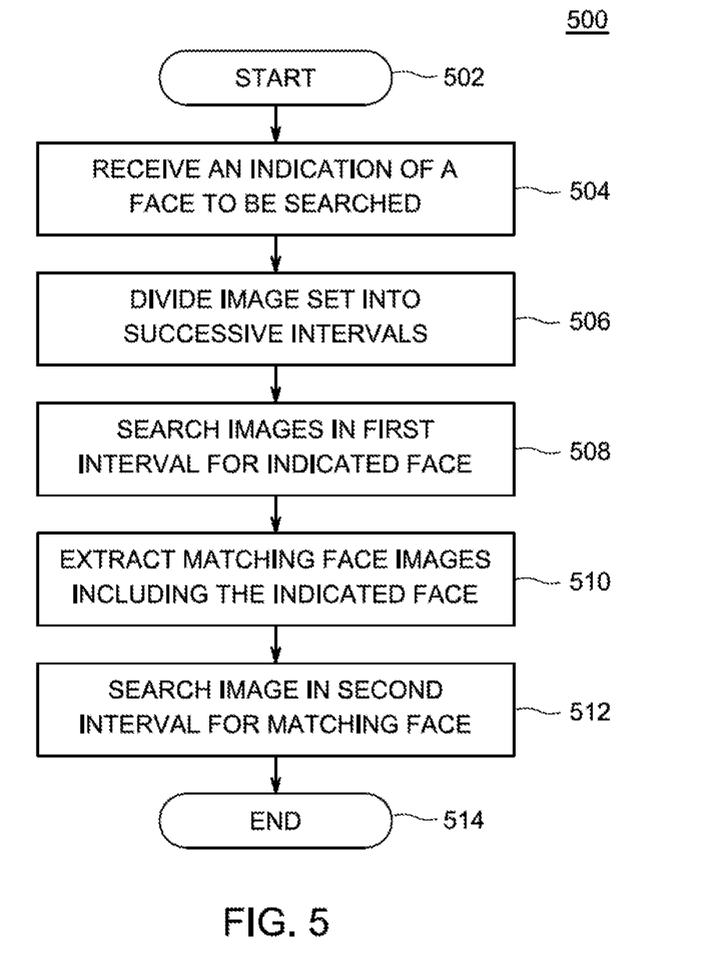
FIG. 5 depicts a flow diagram of a method for searching for an indicated face in images of an image set, as performed by the search module of FIG. 1, according to one or more embodiments of the invention.

FIG. 5 depicts a flow diagram of a method 500 for searching for an indicated face in images of an image set, as performed by the search module 114 of FIG. 1, according to one or more embodiments of the invention. The method 500 starts at step 502 and proceeds to step 504.

At step 504, the method 500 receives an indication of a face of a person to be searched. In one example, the indication is via a user input of selecting a face in an image, for example by "tagging" the face. The indicated face identifies a person the user would like to search for in an image set. In another example, the indication is received from an uploaded image that includes only the face of the person to be searched. In another example, the indication is received via a camera on a user's device that takes an image of the face to be searched. Any approach to indicating a face of a person to be searched may be utilized. The image set can be any set of images, where each image in the set of images includes a timestamp that identifies a creation date for the image.

The method 500 proceeds to step 506, where the method 500 divides the image set into successive time intervals. The method 500 orders the image set based on the timestamps of the images. The method 500 then divides the image set based on time intervals, for example, by month. The method 500 identifies the timestamp from each image. The timestamp determines what time interval the image belongs. For example, if the time intervals are by month, all images taken in a given month of a given year are determined be in a same time interval. For example, if the images in the image set were taken from January 2012 and February 2012, all images with a timestamp in January of 2012 are placed in a first time interval. All images taken in February 2012 are placed in a second time interval.

The method 500 proceeds to step 508, where the method 500 searches the images in the first time interval for the indicated face. The method 500 performs facial recognition on the images in the first time interval. The method 500 may use any facial recognition algorithm known in the art. Facial recognition algorithms identify facial features by extracting landmarks, or features, from an image of the reference face. For example, an algorithm may analyze a relative position, size, and shape of the eyes, nose, cheekbones, and jaw. These features are then used to search the images in the first time interval in order to identify matching features.

The method 500 proceeds to step 510, where the method 500 extracts a face from each image that is determined to include the indicated face. If more than one image includes a face that matches the indicated face, each matching face is extracted.

The method 500 proceeds to step 512. At step 512, the method 500 searches the images in the second time interval for the extracted face(s) from the first time interval. The step 510 and 512 are repeated for each time interval in the image set. All images in the image set that are determined to include a face that matches the person being searched are provided as the output of a search of the image set.

The method 500 proceeds to step 514 and ends.

Figure 6:
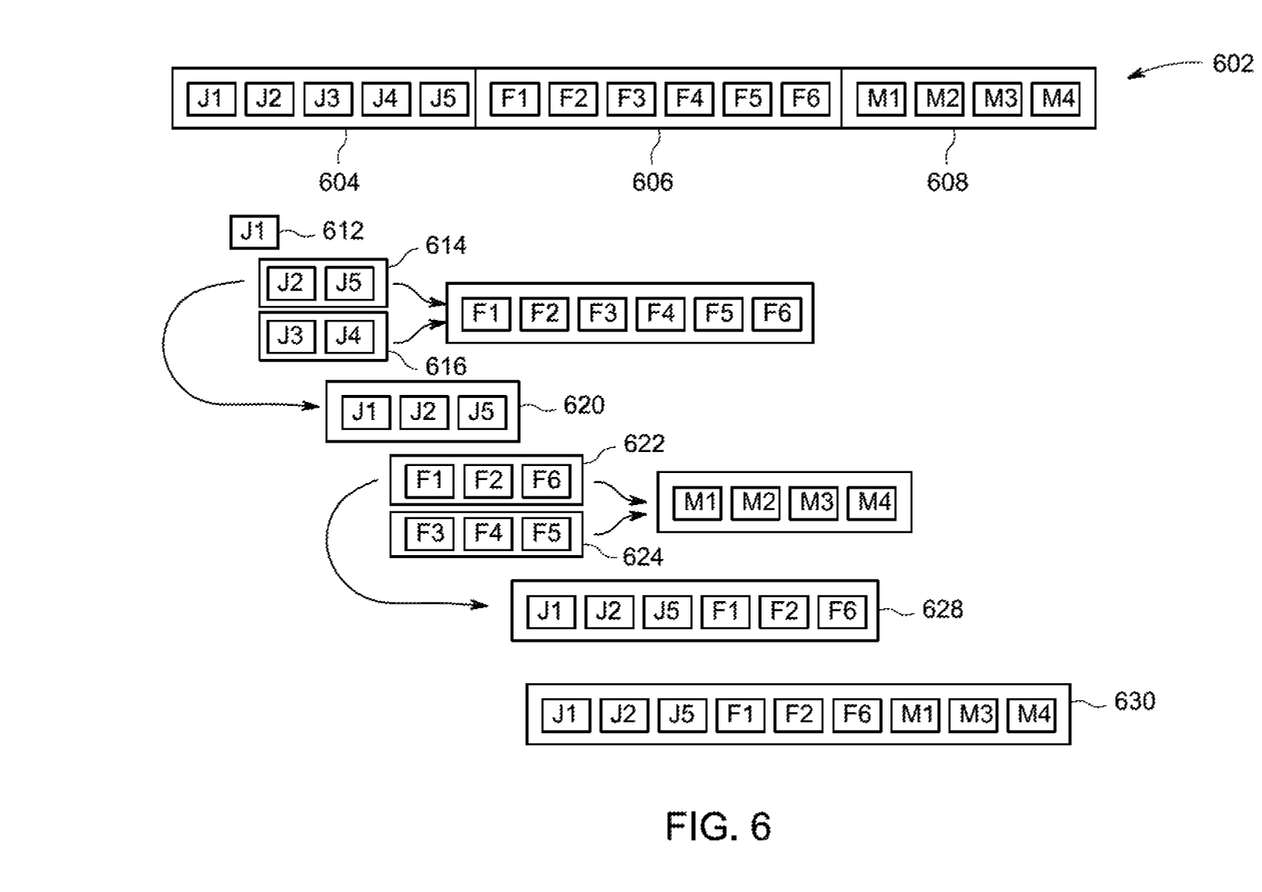
FIG. 6 illustrates searching an image set in accordance with an embodiment of the present invention.

FIG. 6 illustrates searching an image set in accordance with an embodiment of the present invention. The filtered image set 602 includes fifteen images. The filtered image set 602 has been filtered to remove any images that do not include a face. As such every image in the filtered image set 602 includes a face. For simplicity of explanation, in the present example, each image in the filtered image set 602 includes a single face. The images in the filtered image set 602 have been ordered according to their timestamps. In the present example, the images were taken over a timespan of three months, from January through March. For illustration, the images are separated into successive time intervals based on the month in which each image was taken. Time interval 604 includes all images taken in January, namely images J1, J2, J3, J4, and J5. Time interval 606 includes all images taken in February, namely images F1, F2, F3, F4, F5, and F6. Time interval 608 includes all images taken in March, namely images M1, M2, M3, and M4.

The user selects a face of a person to be searched from image J1. Facial recognition is performed on images in a first time interval which, in the present example is January, in order to identify the face selected in image J1. The selected face is then found using facial recognition in images J2 and J5. The image that includes the selected face, J1 is saved as the resultant image set 612. The face in each image in the January time interval that was found to match the face selected in J1, specifically, the face in J2 and J5, become the positive reference set 614. The faces in each image in the January time interval that were found not to match the face selected in J1, namely the faces in J3 and J4, become the negative reference set 616. In the present example, each image in the filtered image set 602 includes one face. However, if each image included, for example two faces, then the matching faces in J2 and J5 become the positive reference set 614 and the other non-matching face in J2 and J5, in addition to the non-matching faces in J3 and J5, become the negative reference set 616. The images, J2 and J5 that were found to include the face selected from J1 are added to the resultant image set 620.

Facial recognition is then performed on the images in the next successive time interval, that is, time interval 606, February. The matching faces in the positive reference set 614 and the non-matching faces in negative reference set 616 are used by the facial recognition algorithm to search the images in the February time interval 606. The matching faces in the positive reference set 614 are used as references to find faces in the February time interval 606. The non-matching faces in the negative reference set 614 are used by the facial recognition algorithm as references of faces to exclude when searching the images in the February time interval 606.

The face of the person being searched from J2 and J5 is found in images F1, F2, and F6. The images from the February time interval 606 that were found to include the face of the person being searched, namely F1, F2, and F6 are added to the resultant image set 628. The faces found in images from the February time interval 606 that match the faces in the positive reference set 614 replace the matching faces in the positive reference set 622. The faces in the images from the February time interval 606 that were found to not match the face of the person being searched, specifically the faces in F3, F4, and F5 replace the non-matching faces in the negative reference set 624.

Facial recognition is performed on the images in the next successive time interval, that is, time interval 608, March. The matching faces in the positive reference set 622 and the non-matching faces in negative reference set 624 are used by the facial recognition algorithm. The matching faces in the positive reference set 622 are used as references to find faces in the March time interval 608. The non-matching faces in the negative reference set 624 are used by the facial recognition algorithm as references of faces to exclude when searching the images in the March time interval 608.

The face of the person being searched from images F1, F2, and F6 (i.e., the faces in the positive reference set 622) are found in images M1, M2, and M3 from the March time interval 608. The images that were found to include a face matching the faces in the positive reference set 622 are added to the resultant image set 628. The resultant image set 628 now includes images J1, J2, J5, F1, F2, and F6. Because the March time interval 608 is the final time interval, the images in the March time interval 608 that were found to include the face of the person being searched, namely M1, M2, and M3, are added to the resultant image set 630. As such, after searching the filtered image set 602, the images that were found to include the selected face from image J1 are included in the resultant image set 630. In accordance with the described embodiments, facial recognition over a timespan that includes a plurality of successive time intervals is accurately performed because the face of person being searched is always taken from a most recent time interval that includes an image of the face.

The embodiments of the present invention may be embodied as methods, apparatus, electronic devices, and/or computer program products. Accordingly, the embodiments of the present invention may be embodied in hardware and/or in software (including firmware, resident software, microcode, etc.), which may be generally referred to herein as a "circuit" or "module". Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device. These computer program instructions may also be stored in a computer-usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks.

The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium include the following: hard disks, optical storage devices, a transmission media such as those supporting the Internet or an intranet, magnetic storage devices, an electrical connection having one or more wires, a portable computer diskette, a random access memory (RAM), a read-only memory (ROM), an erasable programmable read-only memory (EPROM or Flash memory), an optical fiber, and a compact disc read-only memory (CD-ROM).

Computer program code for carrying out operations of the present invention may be written in an object oriented programming language, such as Java®, Smalltalk or C++, and the like. However, the computer program code for carrying out operations of the present invention may also be written in conventional procedural programming languages, such as the "C" programming language and/or any other lower level assembler languages. It will be further appreciated that the functionality of any or all of the program modules may also be implemented using discrete hardware components, one or more Application Specific Integrated Circuits (ASICs), or programmed Digital Signal Processors or microcontrollers.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present disclosure and its practical applications, to thereby enable others skilled in the art to best utilize the invention and various embodiments with various modifications as may be suited to the particular use contemplated.

The methods described herein may be implemented in software, hardware, or a combination thereof, in different embodiments. In addition, the order of methods may be changed, and various elements may be added, reordered, combined, omitted, modified, etc. All examples described herein are presented in a non-limiting manner. Various modifications and changes may be made as would be obvious to a person skilled in the art having benefit of this disclosure. Realizations in accordance with embodiments have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

While the foregoing is directed to embodiments of the present invention, other and further embodiments of the invention may be devised without departing from the basic scope thereof, and the scope thereof is determined by the claims that follow.

The invention claimed is:

1. A computer implemented method comprising:
   receiving an indication of a face to be searched in an image set, where each image in the image set comprises a timestamp that identifies a creation date of the image, the creation date being in a continuum of successive time intervals;
   performing facial recognition to identify the indicated face in one or more images in a first time interval from a plurality of successive time intervals in the continuum using a positive reference set comprising one or more faces from a previous time interval that match the indicated face and a negative reference set comprising one or more faces from the previous time interval that do not match the indicated face;
   replacing the one or more faces from images from the previous time interval in the positive reference set with one or more faces from images from the first time interval that match the indicated face;
   replacing the one or more faces from images from the previous time interval in the negative reference set with one or more faces from images from the first time interval that do not match the indicated face; and
   performing facial recognition to identify the indicated face in one or more images in a second time interval from the plurality of successive time intervals using the positive reference set and the negative reference set, the second time interval being successive to the first time interval.

2. The method of claim 1, further comprising:
   removing images of the image set that do not comprise a face; and
   ordering images of the image set according to the timestamp of each image.

3. The method of claim 2, wherein the successive time intervals are identified as repeating time periods of one of months, weeks of years.

4. The method of claim 1 further comprising:
   performing facial recognition on the one or more images in the previous time interval using the indicated face as a reference, where each image in the previous time interval comprises a timestamp that is within the previous time interval;
   storing one or more images from the previous time interval that include the one or more faces that match the indicated face in a resultant image set;
   generating the positive reference set for the previous time interval, the positive reference set comprising the one or more faces from images from the previous time interval that match the indicated face; and
   generating the negative reference set for the previous time interval, the negative reference set comprising the one or more faces from images from the previous time interval that do not match the indicated face.

5. The method of claim 4, further comprising: determining that the one or more images in the second time interval do not include the indicated face;
   retaining the one or more faces from images from the first time interval that match the indicated face in the positive reference set; and
   replacing the one or more faces from images from the first time interval in the negative reference set with one or more faces from images from the second time interval that do not match the indicated face.

6. The method of claim 5, further comprising:
   performing facial recognition to identify the indicated face in one or more images in a plurality of image groups corresponding to a plurality of successive time intervals;
   determining that a number of image groups from the plurality of image groups that do not have the indicated face in any images meets a predefined threshold; and
   requesting a selection of a face in an image comprising a timestamp in a next time interval, the next time interval successive to a last searched time interval.

7. The method of claim 1, wherein performing facial recognition for the second time interval comprises using one or more images in the positive reference set as reference to identify the indicated face in the one or more images of the second time interval, and using the one or more images in the negative reference set as reference to identify faces to exclude from possible matches of the indicated face in the one or more images in the second time interval.

8. An apparatus for mitigating face aging errors when performing facial recognition comprising:
   at least one processor; and
   a non-transitory computer readable storage medium comprising instructions that, when executed by the at least one processor, cause the apparatus to:
   receive an indication of a face to be searched in an image set, where each image in the image set comprises a timestamp that identifies a creation date of the image, the creation date being in a continuum of successive time intervals;

perform facial recognition to identify the indicated face in one or more images in a first time interval from a plurality of successive time intervals in the continuum using a positive reference set comprising one or more faces from a previous time interval that match the indicated face and a negative reference set comprising one or more faces from the previous time interval that do not match the indicated face;

replace the one or more faces from images from the previous time interval in the positive reference set with one or more faces from images from the first time interval that match the indicated face;

replace the one or more faces from images from the previous time interval in the negative reference set with one or more faces from images from the first time interval that do not match the indicated face; and perform facial recognition to identify the indicated face in one or more images in a second time interval from the plurality of successive time intervals using the positive reference set and the negative reference set, the second time interval being successive to the first time interval.

9. The apparatus of claim 8, further comprising instructions that, when executed by the at least one processor, cause the apparatus to:

remove images of the image set that do not comprise a face; and order images of the image set according to the timestamp of each image.

10. The apparatus of claim 8, further comprising instructions that, when executed by the at least one processor, cause the apparatus to:

perform facial recognition on the one or more images in the previous time interval using the indicated face as a reference, where each image in the previous time interval comprises a timestamp that is within the previous time interval;

store one or more images from the previous time interval that include the one or more faces that match the indicated face in a resultant image set;

generate the positive reference set for the previous time interval, the positive reference set comprising the one or more faces from images from the previous time interval that match the indicated face; and generate the negative reference set for the previous time interval, the negative reference set comprising the one or more faces from images from the previous time interval that do not match the indicated face.

11. The apparatus of claim 10, further comprising instructions that, when executed by the at least one processor, cause the apparatus to:

determine that the one or more images in the second time interval do not include the indicated face;

retain the one or more faces from images from the first time interval that match the indicated face in the positive reference set; and replace the one or more faces from images from the first time interval in the negative reference set with one or more faces from images from the second time interval that do not match the indicated face.

12. The apparatus of claim 8, further comprising instructions that, when executed by the at least one processor, cause the apparatus to:

perform facial recognition to identify the indicated face in one or more images in a plurality of image groups corresponding to a plurality of successive time intervals;

determine that a number of image groups from the plurality of image groups that do not have the indicated face in any images meets a predefined threshold; and request a selection of the face in an image comprising a timestamp in a next time interval, the next time interval successive to a last searched time interval.

13. The apparatus of claim 8, wherein instructions that, when executed by the at least one processor, cause the apparatus to perform facial recognition for the second time interval by performing steps comprising using the one or more images in the reference set as reference to identify the indicated face in the one or more images of the second time interval, and using the one or more images in the negative reference set as reference to identify faces to exclude from possible matches of the indicated face in the one or more images in the second time interval.

14. A non-transitory computer readable medium for storing computer instructions that, when executed by at least one processor cause a computer system to:

receive an indication of a face to be searched in an image set, where each image in the image set comprises a timestamp that identifies a creation date of the image, the creation date of the image, the creation date being in a continuum of successive time intervals; and perform facial recognition to identify the indicated face in one or more images in a first time interval from a plurality of successive time intervals in the continuum using a positive reference set comprising one or more faces from a previous time interval that match the indicated face and a negative reference set comprising one or more faces from the previous time interval that do not match the indicated face;

replace the one or more faces from images from the previous time interval in the positive reference set with one or more faces that match the indicated face from the first time interval;

replace the one or more faces from images from the previous time interval in the negative reference set with one or more faces from images from the first time interval that do not match the indicated face; and perform facial recognition to identify the indicated face in one or more images in a second time interval from the plurality of successive time intervals using the positive reference set and the negative reference set from the first time interval, the second time interval being successive to the first time interval.

15. The non-transitory computer readable medium of claim 14, further comprising instructions that, when executed by at least one processor, cause the computer system to:

remove images of the image set that do not comprise a face; and order images of the image set according to the timestamp of each image.

16. The non-transitory computer readable medium of claim 15, wherein the successive time intervals are identified as repeating time periods of one months, weeks, or years.

17. The non-transitory computer readable medium of claim 14, wherein the instructions, when executed by the at least one processor, cause the computer system to search to identify the indicated face in one or more images in a first time interval by performing steps comprising:

performing facial recognition on the one or more images in the previous time interval using the indicated face as a reference, where each image in the previous time interval comprises a timestamp that is within the previous time interval;

storing one or more images from the previous time interval that include the one or more faces that match the indicated face in a resultant image set;

generating the positive reference set for the previous time interval, the positive reference set comprising the one or more faces from images from the previous time interval that match the indicated face; and generating the negative reference set for the previous time interval, the negative reference set comprising the one or more faces from the images from the previous time interval that do not match the indicated face.

18. The non-transitory computer readable medium of claim 17, further comprising instructions that, when executed by the at least one processor, cause the computer system to:

retain the one or more faces from images from the first time interval that match the indicated face in the positive reference set; and replace the one or more faces from images from the first time interval in the negative reference set with one or more faces from images from the second time interval that do not match the indicated face.

19. The non-transitory computer readable medium of claim 18, wherein the instructions, when executed by the at least one processor, cause the computer system to perform facial recognition for the second time interval by performing steps comprising using the one or more images in the positive reference set as reference to identify the indicated face in the one or more images of the second time interval, and using the one or more images in the negative reference set as reference to identify faces to exclude from possible matches of the indicated face in the one or more images in the second time interval.

20. The non-transitory computer readable medium of claim 14, further comprising instructions that, when executed by the at least one processor, cause the computer system to:

perform facial recognition to identify the indicated face in one or more images in a plurality of image groups corresponding to a plurality of successive time intervals;

determine that a number of image groups from the plurality of image groups that do not have the indicated face in any images meets a predefined threshold; and request a selection of a face in an image comprising a timestamp in a next time interval, the next time interval successive to a last searched time interval.

* * * * *